March 9, 1965 C. E. NORTON 3,172,591
MACHINE FOR CONVEYING A CONTINUOUS LINE OF PIPE
Filed Oct. 12, 1962 2 Sheets-Sheet 1
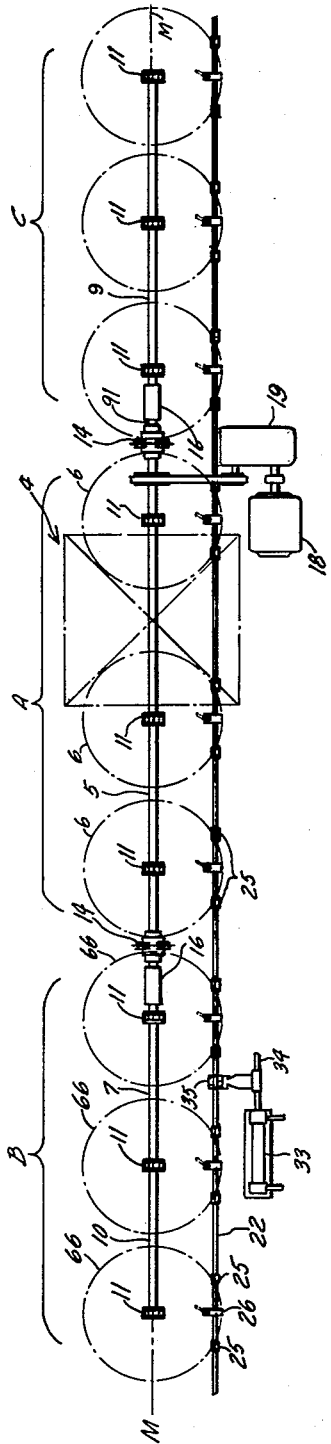
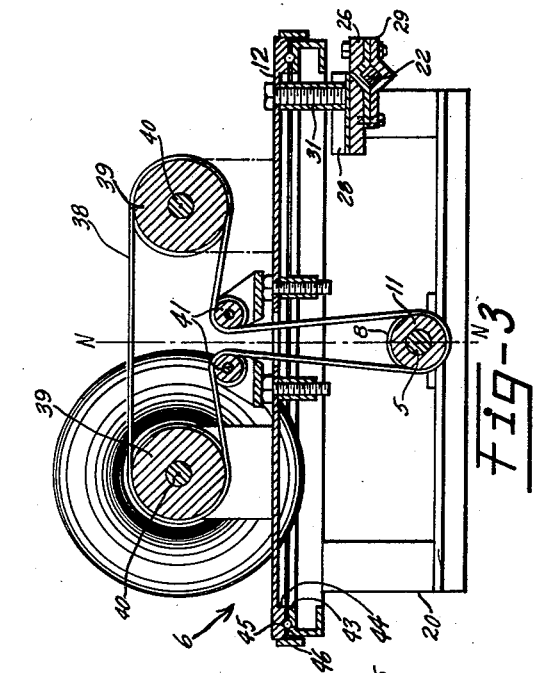
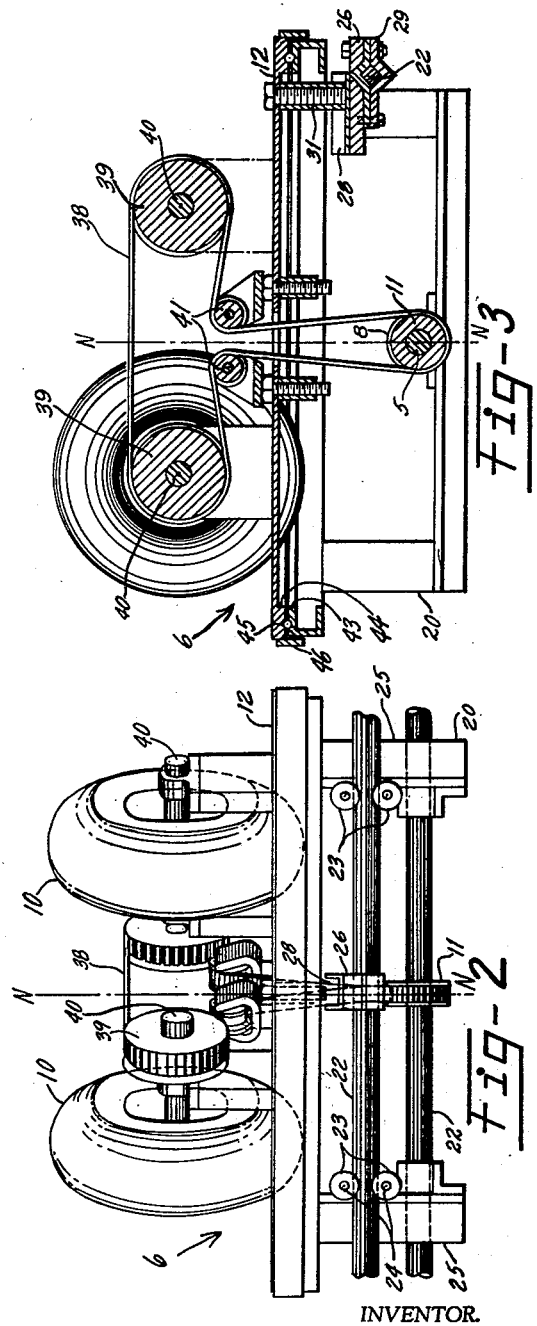
INVENTOR.
CHARLES E. NORTON
by Henry Kozak
ATTORNEY March 9, 1965   C. E. NORTON   3,172,591
MACHINE FOR CONVEYING A CONTINUOUS LINE OF PIPE
Filed Oct. 12, 1962   2 Sheets-Sheet 2
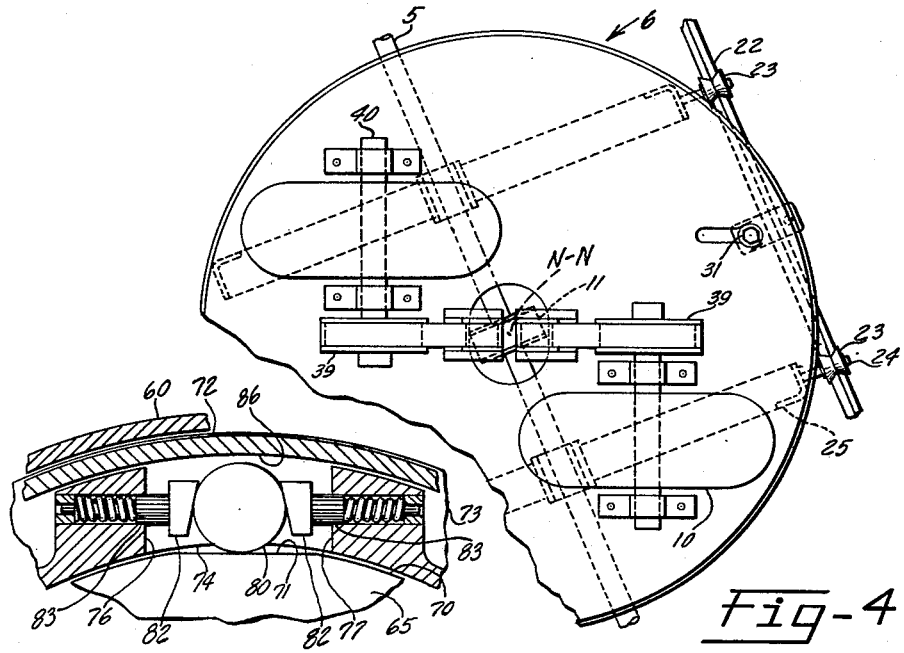
Fig-4
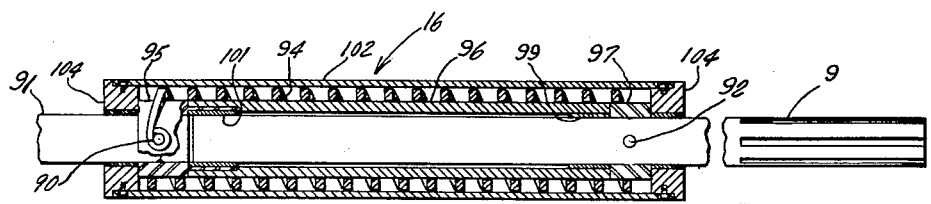
Fig-7
Fig-5
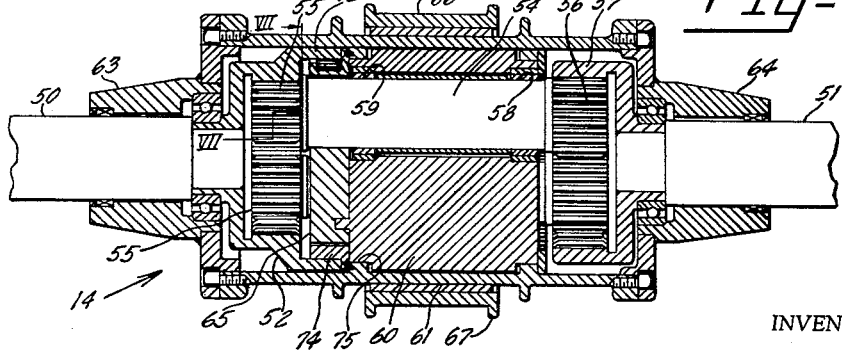
Fig-6
INVENTOR.
CHARLES E. NORTON
by Henry Kozak
ATTORNEY ＝
United States Patent Office 3,172,591
Patented Mar. 9, 1965

3,172,591
MACHINE FOR CONVEYING A CONTINUOUS LINE OF PIPE
Charles E. Norton, Chicago, Ill., assignor to National Castings Company, Cleveland, Ohio, a corporation of Ohio
Filed Oct. 12, 1962, Ser. No. 230,052
7 Claims. (Cl. 226—99)

This invention relates to an arrangement of equipment defining a straightline pipe path for conveying pipe wherein pipe may be successively fed into one end and passed longitudinally one after the other into a region wherein they are brought into substantially engaged end-to-end relationship for a manufacturing step performed thereon. Thereafter the pipes proceed along the path to a point at which their movement is accelerated to effect an end-to-end separation thereof preparatory to being removed from the equipment for stacking or other parallel arrangement of pipes.

The primary object of this invention is to provide equipment based essentially on a series of two-wheel stands or turntables spaced along a rectilinear path of the pipe somewhat as found in prior art systems but with improvements providing more simplified construction and arrangement of the equipment and increased facility in regulating the relative speeds of the pipes in various sections of the path. Other objects include the performance of manufacturing operations requiring end-to-end conveying of pipe with substantially less labor per pipe and substantially greater conveying rates than by conventional equipment.

A further object is to provide a pipe-conveying system which requires less components to thus avoid the mechanical complexity entailed in the usual pluralities of shafts, universal joints, and sliding spline connections, and track-and-dolly conveyors.

A further object of the invention is to incorporate into the pipe conveying system a driving arrangement which will make possible the use of a single type of pipe-propulsion device utilizing two radially overlapping wheels at all positions for such devices along a pipe-conveying line to thus make unnecessary the use of more than one type of conveying device.

According to the present invention, there is provided apparatus for simultaneously rotating and conveying pipes or other elongate cylindrical articles in end-to-end succession through an intermediate treatment station comprising:

(1) A plurality of turntable devices spaced along a path for the pipe which are divided into at least three groups with a middle group extending through a station for performing a manufacturing operation on the pipe. Each turntable comprises a pair of wheels rotatably mounted along parallel horizontal axes with the part of the table mounting the wheels being rotatable relative to a vertical axis and a base of the table to vary the angular relationship of the wheel axes with the pipe path. The apparatus further comprises;

(2) A drive shaft for each group of tables extending through the bases thereof in drive relation with the wheels of each turntable;

(3) A source of power for driving the shaft of the middle group; and (4) Coupling mechanism at each end of the shaft of the middle group for connecting it to the shaft of the adjacent group comprising an overdrive transmission. Each of the two transmissions is oriented relative to the shaft of the middle group to drive the other shaft connected therewith at one speed equal to, and another speed greater than, the speed of the middle shaft. Since the turntables are all adjustable to change the cant of the wheels relative to the pipe path, a preferred embodiment includes a table adjusting device extending rectilinearly through the entire line of tables. Whereby all of the tables may be adjusted simultaneously to accommodate a certain size pipe with difference in rates of pipe movement in different portions of the pipe-path obtained through the use of the overdrives.

In the drawing in respect to which this invention is described below in detail:

FIG. 1 is a schematic plan view of a drive line and a canting mechanism for a plurality of turntable devices such as the one illustrated singly in FIGS. 2–4.

FIG. 2 is an elevation of a pipe-advancing turntable device as viewed transversely of a drive shaft therefor showing the shafts of the pipe-advancing wheels in canted relation with the drive shaft.

FIG. 3 is an elevation of the device of FIG. 2 taken along a section perpendicular to the drive shaft therefor and showing the axes of pipe-support wheels parallel to the drive shaft axis.

FIG. 4 is a plan view of the device of FIGS. 2 and 3 showing the pipe-advancing wheels thereof with their axes in canted relation with the drive shaft.

FIG. 5 is a longitudinal section of a torsion shock absorber indicated schematically in FIG. 1.

FIG. 6 is a longitudinal section of an over-drive transmission indicated schematically in FIG. 1.

FIG. 7 is a fragmentary enlarged view of components of the clutch mechanism of the transmission of FIG. 6 as viewed along line 7—7 thereof.

The invention is now described with respect to an arrangement of equipment that will receive the pipe in consecutive order, bring them into end-to-end relationship and then pass them through a treatment station, and after passing from the treatment station dispose them in a separated condition facilitating their removal in successive order from the equipment. FIG. 1 is a schematic plan view of an arrangement of equipment particularly suited for effecting a coating and wrapping process within a region indicated generally by a square 4 drawn in dot-dash generally centered over a drive shaft 5 extending rectilinearly through an intermediate group A of three turntables 6 indicated by circles drawn in dot-dash.

The equipment shown comprises three groups of turntables of which all tables are spaced in a generally rectilinear pattern along an approximate axis M—M of respective drive shafts 5, 7, and 9. Each of these shafts is connected in drive relation with pipe advancing wheels 10 of each turntable by a pulley 11 horizontally centered under a rotatable platform 12 of each turntable. Preferably, the wheels 10 comprise pneumatic automotive type tires in view of their yielding and efficient frictional contact with the pipes. If desired, the turntables of the various groups A, B, and C may be identical.

The shaft 5 of group A is connected, for example, with the shaft 7 of group B by connecting means comprising an overdrive transmission 14 and a torsion-absorbent shock absorber 16. A similar transmission and shock absorber connect the shaft 5 with the shaft 9 of group C. Hence, as the drawing clearly indicates, the shaft 5 and the turntables 6 driven therefrom are primarily driven by a power source, such as a motor 18 and a gear reduction unit 19 in belt or sprocket drive relation with the shaft 5. The turntables of groups B and C are then driven by the shaft 5 by means of the connecting mechanism between the shaft 5 and respective draft shafts for groups B and C already named.

FIG. 1 further illustrates the mechanism for shifting the rotatable platform 12 of each turntable about a vertical axis N—N relative to a non-rotatable stand or base 20 of the same turntable. In the embodiment illustrated by FIG. 1, the table shifting mechanism comprises a bar 22 extending the full length of the three groups of tables through pairs of rollers 23 supported on horizontal trunnions 24 attached to legs 25 of the table base 20. Between the two horizontally spaced pairs of rollers 23 of each stand, the bar 22 supports a transverse arm 26 defining an upwardly opening elongate groove or slot 28 extending longitudinally of the arm 26, i.e., transversely of the rod 22. Each arm 26 is held in fixed relation with the bar 22 by means such as a clamping bracket 29 bolted to the arm 26 in the manner shown to cause the arm and the bracket to grip the bar. A crank pin 31 attached rigidly to the table top 12 with its length aligned vertically to dispose its bottom end portion within the groove 28 enables angular adjustment of the platform 12 about its axis N—N as the result of longitudinal movement of the bar 22. Such rotation of the bar 22 as might cause the arm to deflect downwardly out of engagement with the pin 31 is prevented by the complementary relation which exists between the square cross section of the bar and the right angle groove construction of the rollers 23.

Longitudinal adjustment of the bar and hence angular adjustment of the platform 12 may be effected by manually operated or power operated mechanisms. Preferably a servo mechanism is used, such as the fluid cylinder 33 fixed to the floor or other base and having its piston rod 34 connected to the bar 22 at 35 as shown.

As shown in FIGS. 2–4, power is transmitted from the shaft 5 through a belt-drive comprising the pulley 11, a belt 38 through power-receiving pulleys 39 fixed to the shafts 40 in coaxial shaft-sharing relation with each wheel 10. The bearings for the shafts 40 are fixed to the platform 12. Attached to each platform is a pair of idler pulleys 41 which maintain the belt in tracking relation with pulleys 39 and 11 at different positions of angular position of the platform about its axis and relative to the pulley 11.

The platform 12 and the base 20 comprise vertically opposed circular bearing races 43 and 44 grooved along opposing surfaces to receive a plurality of balls 45. The table top further comprises a dust shield 36 attached along the outer periphery of the race 44.

The present invention is particularly adapted for passing pipe in engaged end-to-end relation through the treatment station 4. However, such a function entails closing the gap between successively loaded pipe before they enter the treatment station and at a point substantially beyond the treatment station separating a pipe which has proceeded beyond the treatment station into an unloading area from the adjacent pipe currently proceeding through the treatment station. The operation of the equipment as a whole involves temporary speed-ups of the wheels 10 in the pipe-receiving group A and the pipe discharging group B. It will be desirable in most instances to separately control the speeds of groups B and C. In the present embodiment, a further complication arises out of the fact that shafts 5, 7, and 9 must be rotated in the same direction but the action of the transmissions at each end of shaft 5 will be in reverse direction relative to each other where there is a need to increase the speed of shafts 7 and 9 relative to that of shaft 5. Hence, the present invention utilizes an overdrive transmission having reverse operation in both directions of rotation.

Exemplary of a transmission that may be used in practicing this invention is that illustrated by FIGS. 6 and 7. In FIG. 6 the flow of power may be assumed to proceed left to right from an input shaft 50 to an output shaft 51 through an internal gear 52 fixed to the shaft 50, a plurality of spindles 54 comprising pinions 55 at one end in mesh with the gear 52 and pinions 56 at their other ends in mesh with an internal gear 57 fixed to the output shaft 51. The pinions 54 are supported in bearing relation at, e.g., 58 and 59, with a barrel like rotor 60 fitting within the housing 61 of the transmission. The housing 61 also comprises a pair of end caps 63 and 64 in bearing relation with the shafts 50 and 51, respectively.

Overdrive operation of the transmission 14 is obtained in either direction of rotation by a plurality of speed controlling units disposed at several locations about the periphery of an end portion 65 of the rotor 60.

FIG. 7 illustrates the parts of this clutch mechanism in relative positions assumed when the housing is restrained from rotation by a pair of brake shoes 66, 67.

The clutch mechanism as shown comprises the rotor end portion 65 provided with a generally cylindrical surface 70 having a plurality of chordal flat areas 71; a band-shape annular extension or flange 72 of the internal gear 52 in radially-spaced opposed relation with the surface 70; an annulus 74 having a ring-like flange 73 bolted to an internal flange 75 of the housing but having pairs of axially-extending lugs 76, 77 extending in an axial direction into the annular region between the gear flange 72 and the rotor surface 70. The clutch mechanism further comprises a chock or other wedging element, such as the roller 80 shown supported midway between the lugs 76 and 77 against the flat area 71 by a pair of pushers 82. The latter have shank portions 83 received in complementary bores through the lugs 76, 77. The pushers 82 are spring loaded within the bores as shown to urge the roller 80 into the intermediate position shown.

When the shoes 66, 67 are released and the housing is free to rotate, the resistive torsion or drag provided by a load on the output shaft 51 causes the rotor 60 to rotate or lag slightly with respect to flange 72 of the input gear 52. The flat surface 71 of the rotor thereupon shifts underneath the roller 80 in a circumferential direction to wedge it between the area 71 and the inner surface 86 of the internal gear flange 72. With the clutch thus engaged, the housing 60 and all parts contained therein rotate as a unit without relative movement and the speeds of shafts 50 and 51 are thus equal.

When the brake shoes 66 and 67 thereafter engage and stop the casing 60, the clutch mechanism resumes the relative position of parts shown in FIG. 7. This action is accompanied by the driving of the spindles 54 by the internal gear 52 through pinions 55, driving of the output internal gear 57 through pinions 56 and a difference in speeds of shafts 50 and 51 depending upon the gear ratios employed.

FIG. 5 is illustrative of the two shock absorbers 16 providing resiliency in the connections between shaft 5 and the shafts 7 and 9. This device is shown connecting, for example, shafts 91 and 9 in approximately coaxial end-to-end relationship by a pin 90 through shaft 91 and a pin 92 through the shaft 9. Torsion forces are transmitted from one shaft to another, primarily through a spring 94 connected with pins 90 and 92 as shown with respect to pin 90. The other structure of the device 16 serves primarily for alignment of the shafts, support of the spring, and to keep dirt out of the device. The spring 84 is supported by a sleeve 95 secured by pin 90 to the shaft 91. A sleeve 96 having an end portion in telescopic relationship with an end portion of the sleeve 95, and another sleeve 97 secured to the shaft 93 by the pin 92 provide a substantially outer continuously cylindrical surface to space the spring relative to the shafts 91 and 9. The sleeve 96 is in bearing relation with shaft 93 at 99. The portion of the sleeve 95 extending within an end portion of the sleeve 96 provides a bearing 101 in contact also with the shaft 93. This bearing arrangement maintains the shafts 91 and 93 in axial alignment and permits substantially friction-free relative movement of the shafts such as permitted by the spring 94. The parts of the shock absorber 16 heretofore named are protected from dirt or other extraneous matter by a cylindrical shroud 102 comprising disk-like end walls 103 and 104 free to rotate around respective shafts extending therethrough. The end walls are attached to the cylindrical section of the shroud by means such as the cap screws shown. The spring in relaxed condition has radial clearance with both the shroud and the sleeve 96 to permit radial contraction or expansion in absorbing torsion shocks.

Described above are various components of the apparatus, e.g., the turntables, the drive shafts, the overdrives, and the torsion shock absorbers, and the organization thereof in a system comprising groups of turntables wherein the intermediate group driven from a primary power source and the adjacent groups are driven at selective speeds from the intermediate group by the speed changing transmissions herein described. Contributing to the facility of operation is the use of wheels equipped with pneumatic tires or the like and a drive arrangement providing a uniform base peripheral speed of the wheels throughout the apparatus.

The terms and expressions which have been employed are used as terms of description and not of limitation and there is no intention of excluding such equivalents of the invention described, or of the portions thereof, as fall within the scope of the claims.

What is claimed is:

1. Apparatus for simultaneously rotating and conveying pipes in end-to-end succession through a treatment station comprising:
   (A) a plurality of turntables spaced along a path for the pipe divided into three groups of which the middle group extends through said treatment station;
   each turntable comprising a stationary base, and a pair of wheels rotatably mounted along parallel horizontal axes, and being rotatable mounted along parallel horizontal axes, and being rotatable relative to a vertical axis and the base to vary the angular relationship of said parallel axes to said path;
   (B) a drive shaft for each group of turntables extending serially through the bases thereof in drive relation with said wheels of each turntable;
   (C) means for driving the shaft of the middle group; and
   (D) means at each end of the shaft of the middle group for connecting said shaft to the shaft of the adjacent group in generally coaxial relationship comprising an overdrive transmission;
   each of said transmissions being oriented relative to the shaft of the middle group to drive the other shaft connected therewith at one speed equal to, and another speed greater than, the the speed of the middle shaft; and
   each transmission having means for changing from said one speed to said greater speed in either direction of rotation of said shaft of the middle group.

2. The apparatus of claim 1 comprising:
   means extending parallel to said path into connection with all of said turntables for simultaneously changing the cant of said wheels relative to said path.

3. The apparatus of claim 1 wherein:
   each of said connecting means includes a torsion shock absorber in series coaxial relation with the overdrive transmission thereof.

4. Apparatus for simultaneously rotating and conveying pipes in end-to-end succession through a treatment station comprising:
   (A) a plurality of turntables spaced along a path for the pipe and divided into three groups of which the middle group extends through said treatment station;
   each turntable comprising a base, and a pair of wheels rotatably mounted along horizontal parallel axes, and being rotatable relative to a vertical axis and the base to vary the angular relationship of said parallel axes to said path;
   (B) a drive shaft for each group of tables extending serially through the bases thereof in drive relation with the wheels of each device;
   (C) means for driving the shaft of the middle group; and
   (D) means for connecting the middle shaft to the other shafts in generally coaxial relationship comprising a pair of similar overdrive transmissions, each transmission having means for two-speed operation in both directions of rotation and each transmission being connected with the shaft of the middle group for rotating the other shaft connected therewith at one speed equal to, and another speed greater than, the shaft speed of the middle group.

5. The apparatus of claim 4 comprising:
   means extending substantially parallel to said path interconnecting with all of said turntables for simultaneously changing the angular relationship thereof to said path.

6. The apparatus of claim 4 wherein:
   said wheels are interconnected with said shafts to effect substantially similar peripheral speeds at the same shaft speeds, and said wheels comprise pneumatic tires to effect substantially uniform friction of the wheels relative to the pipes carried thereon along the entire path.

7. The apparatus of claim 4 wherein:
   the wheels of all groups are arranged to define a rectilineal pipe path and said drive shafts and transmissions are coaxial.

References Cited in the file of this patent
UNITED STATES PATENTS

| | | |
|---|---|---|
| 2,765,903 | Watts | Oct. 9, 1956 |
| 2,927,482 | Costello | Mar. 8, 1960 |
| 3,074,605 | Shaw | Jan. 22, 1963 |